United States Patent [19]

Lackore et al.

[11] 4,025,795
[45] May 24, 1977

[54] ULTRAVIOLET LIGHT PROCESSOR HAVING ROTATING SHUTTERS

[75] Inventors: James K. Lackore, Joliet; Warren J. Ramler, Elmhurst, both of Ill.

[73] Assignee: PPG Industries, Inc., Pittsburgh, Pa.

[22] Filed: May 27, 1975

[21] Appl. No.: 581,195

[52] U.S. Cl. .................. 250/504; 34/4; 250/514
[51] Int. Cl.² ........................ H01J 37/00
[58] Field of Search .......... 250/503, 504, 505, 514, 250/453; 34/4

[56] References Cited

UNITED STATES PATENTS

| | | | |
|---|---|---|---|
| 2,423,884 | 7/1947 | Glass | 250/503 |
| 3,654,471 | 4/1972 | Nilsson | 250/505 |
| 3,664,188 | 5/1972 | Kockott | 250/453 |
| 3,733,709 | 5/1973 | Bassemir | 34/4 |
| 3,745,307 | 7/1973 | Peek | 34/4 |
| 3,790,801 | 2/1974 | Coleman | 250/453 |
| 3,826,014 | 7/1974 | Helding | 34/4 |
| 3,829,982 | 8/1974 | Pray | 34/4 |
| 3,831,289 | 8/1974 | Knight | 34/4 |
| 3,894,343 | 7/1975 | Pray | 34/4 |
| 3,914,594 | 10/1975 | Helding | 34/4 |
| 3,930,318 | 1/1976 | Stelter | 34/4 |

Primary Examiner—Craig E. Church
Attorney, Agent, or Firm—George D. Morris; J. Timothy Keane

[57] ABSTRACT

Ultraviolet light processors are provided with rotating cylindrical shutters which, depending upon their position, hinder or permit impingement of ultraviolet light upon a workpiece. The rotary configuration allows for compactness in construction of the processor.

22 Claims, 8 Drawing Figures

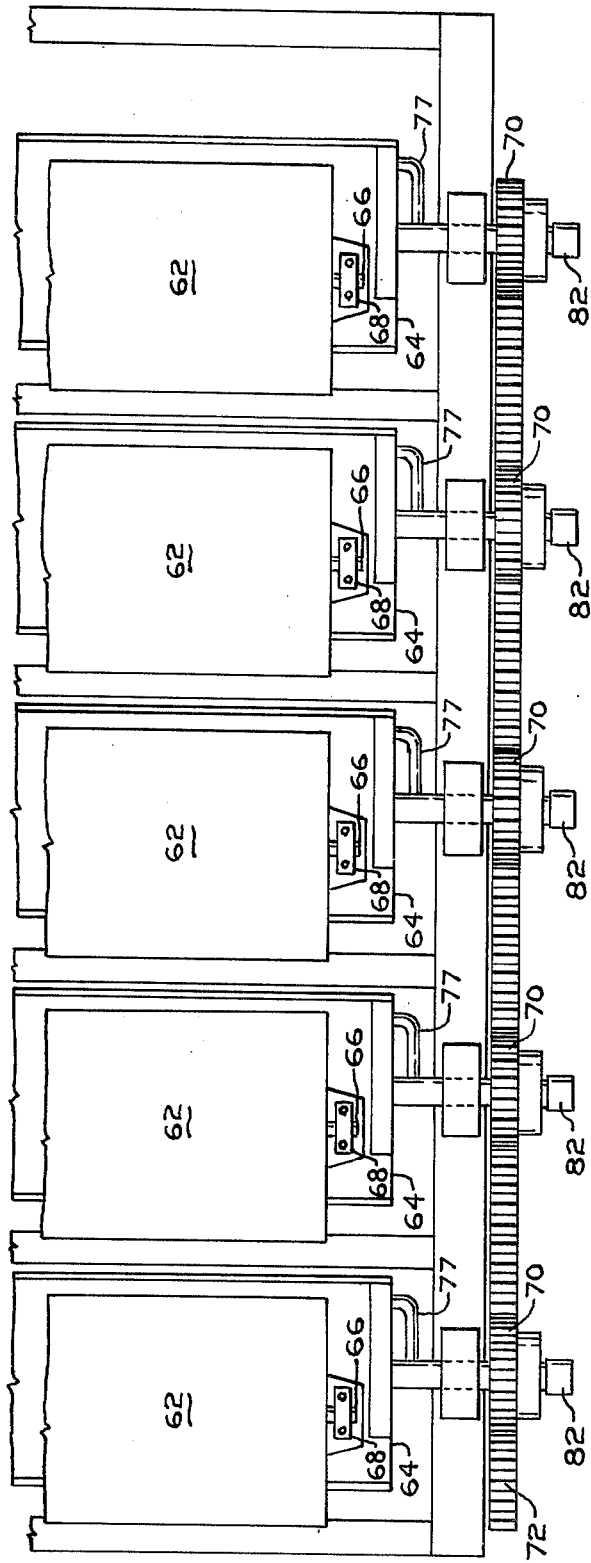
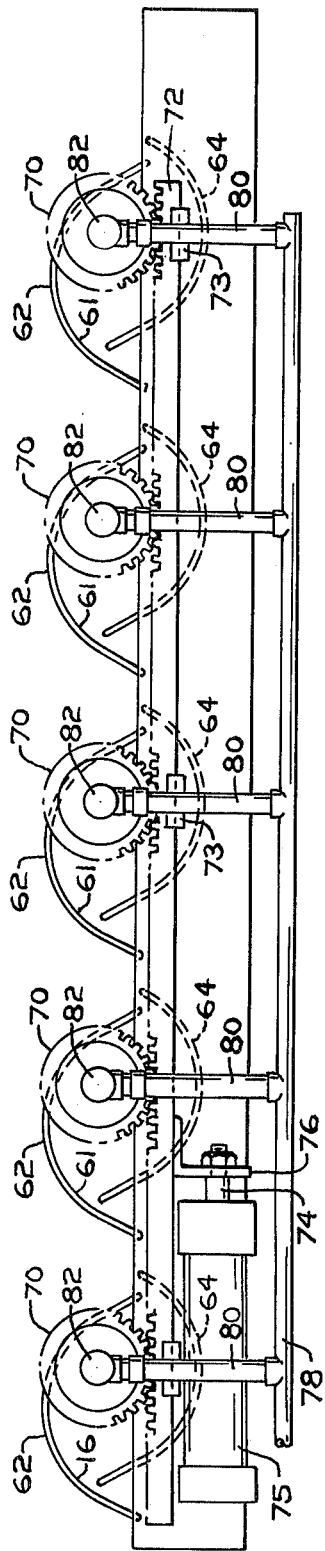
FIG. 6
FIG. 5

ULTRAVIOLET LIGHT PROCESSOR HAVING ROTATING SHUTTERS

Processes in which products are treated with ultraviolet light, such as to effect polymerization, sterilization, etc., are becoming of increasing interest. The use of ultraviolet light coating processors to cure ultraviolet light sensitive coatings is especially becoming more widespread. Advantages of ultraviolet light curing include the ability to use resin systems which have little or no volatile solvents, the speed with which cure may be accomplished and simplicity of operation.

Ultraviolet light processors often employ at least one, and more usually a plurality, of concave cylindrical reflectors for reflecting ultraviolet light from generally linear sources of ultraviolet light to a workpiece. Situations sometimes arise when it is desirable to prevent most, or even substantially all, ultraviolet light emanating from the sources from reaching the workpiece without the necessity of turning off the sources themselves. Such situations can occur when a workpiece becomes lodged within the apparatus or when it is either necessary or desirable for an operator to gain access to those interior portions of the machine usually exposed to ultraviolet light but which are not directly associated with the ultraviolet light sources.

The present invention serves to permit a substantial reduction in the exposure of a workpiece to ultraviolet light emanating from sources of ultraviolet light. This is accomplished by providing an ultraviolet light processor having an optical system comprising at least one concave cylindrical reflector for reflecting ultraviolet light from a generally linear source of ultraviolet light to a workpiece, with a cylindrical shutter having a concave surface facing the source. The shutter is rotatable to a first position between the source and the workpiece to block radiation emanating from the source from impinging upon the workpiece. The shutter is also rotatable to a second position which is away from between the source and the workpiece to permit impingement of radiation emanating from the source upon the workpiece. In the second position, the reflector is interposed between the concave surface of the shutter and the source of ultraviolet light.

Although the ultraviolet light processor may have only one source of ultraviolet light, one reflector, and one shutter, it is more common for there to be a plurality of sources of ultraviolet light together with a reflector and a shutter for each source.

For a better understanding of the invention, reference may be made to the drawings wherein like reference numerals refer to like parts in which:

FIG. 5 shows another mechanism for operating the rotating shutters of an ultraviolet light processor;

FIG. 6 is a portion of the plan view of the ultraviolet light processor of FIG. 5;

Figure 1:
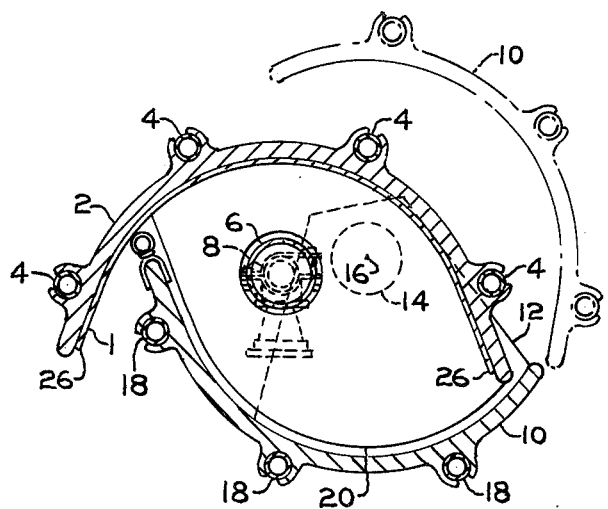
FIG. 1 illustrates one arrangement of a source of ultraviolet light, a reflector and a rotating shutter and is a cross section of FIG. 3.
Figure 3:
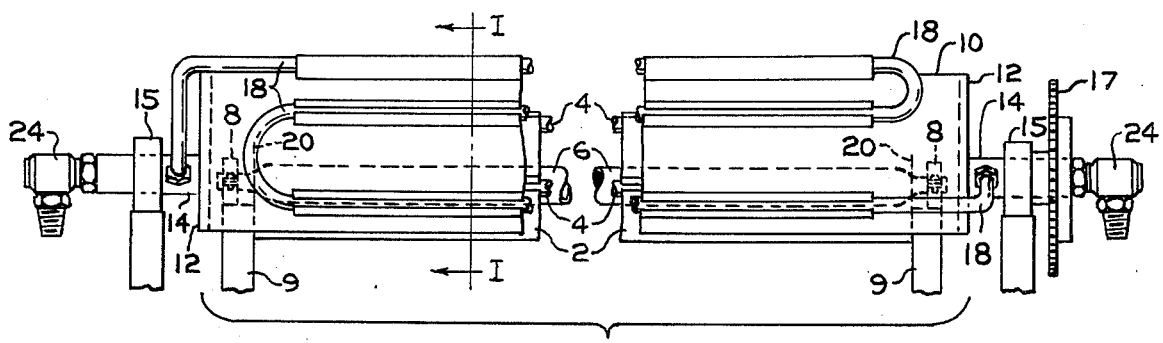
FIG. 3 shows a source of ultraviolet light, a reflector and a rotating shutter.

Referring now in more detail to the FIGS. where the invention will be described with respect to illustrative embodiments thereof, FIGS. 1 and 3 show a reflector 1 held in place by base member 2 which may also have affixed thereto conduits 4 for circulating coolant therethrough. The reflectors may be bright aluminum sheet (e.g. "Alzak", Aluminum Company of America; "Lurium", of European origin) or other ultraviolet light reflective material and may be held in place by screws, not shown. A mercury vapor lamp 6 is held in place at both ends by connector 8 which may advantageously, although not necessarily, be of the type described in U.S. patent application Ser. No. 451,253, filed Mar. 14, 1974. Connectors 8 are mounted on support bases 9. Shutter 10, shown in the closed position, is attached to arms 12 which in turn are attached to trunions 14. The trunions are mounted in pillow blocks 15, permitting the shutter to be rotated about axis 16. Rotation of the shutter is accomplished by turning sprocket wheel 17. A pinion, pulley or the like may be used in lieu of the sprocket wheel. The open position of shutter 10 is shown in phantom in FIG. 1. Shutter 10 may also have affixed thereto conduits 18 for circulating coolant therethrough. Baffles 20 are attached to support bases 9 to substantially reduce the quantity of radiation from the ends of the opitcal system.Each baffle 20 contains a hole, not shown, through which passes a stem of mercury vapor lamp 6. Therefore, baffles 20 shield connectors 8 from much of the radiation which would tend to cause overheating thereof. Also optionally attached to an edge of shutter 10 is asbestos gasket 22 which consists of asbestos cloth wrapped around a tube of steel mesh and stiched together. A portion of the free ends remain to permit mounting on the shutter. When the shutter is in the closed position, this gasket cooperates with the reflector to further reduce leakage of radiation. The phantom outline of the shutter in FIG. 1 does not show asbestos gasket 22 in order to avoid cluttering the drawing.

When conduit 18 is affixed to shutter 10, the ends of the conduit may be attached to a source and sink, respectively, of coolant by meant of flexible tubing. A preferred arrangement is to attach each end of conduit 18 to a trunion 14 so that the conduit communicates with a recess in the trunnion. To each trunnion is attached a swivel adaptor 24 having a passageway which communicates with the recess in the trunnion. The stationary ends of the swivel adaptors are connected, usually through manifolds, to a coolant source and sink, respectively.

Figure 2:
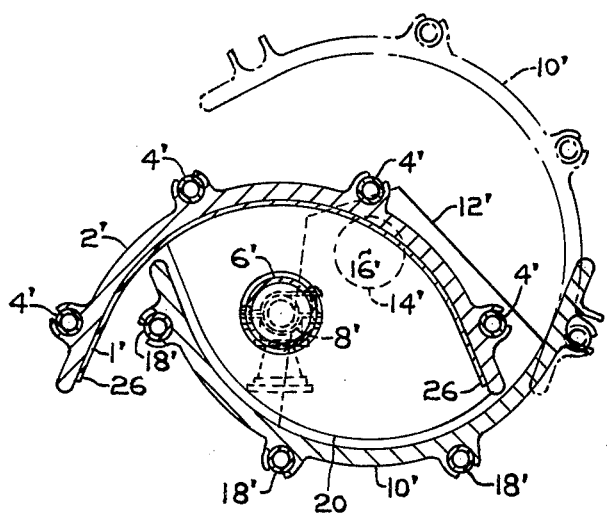
FIG. 2 illustrates another arrangement of a source of ultraviolet light, a reflector and a rotating shutter.

FIG. 2 shows an arrangement which is slightly different in detail from that shown in FIG. 1. Inasmuch as the mechanical part are quite similar in design and function to those of FIG. 2, they are identified with primed reference numerals which substantially correspond to the unprimed reference numerals of FIG. 2.

The axis of shutter rotation is usually parallel to the elements of the concave cylindrical reflector. In a preferred embodiment, the axis of rotation is within the space bounded by the reflector and the mouth 26 of the reflector as shown in FIGS. 1 and 2. It is especially preferred that the axis of rotation be between the reflector and the source of ultraviolet light, also as shown in FIGS. 1 and 2.

Figure 4:
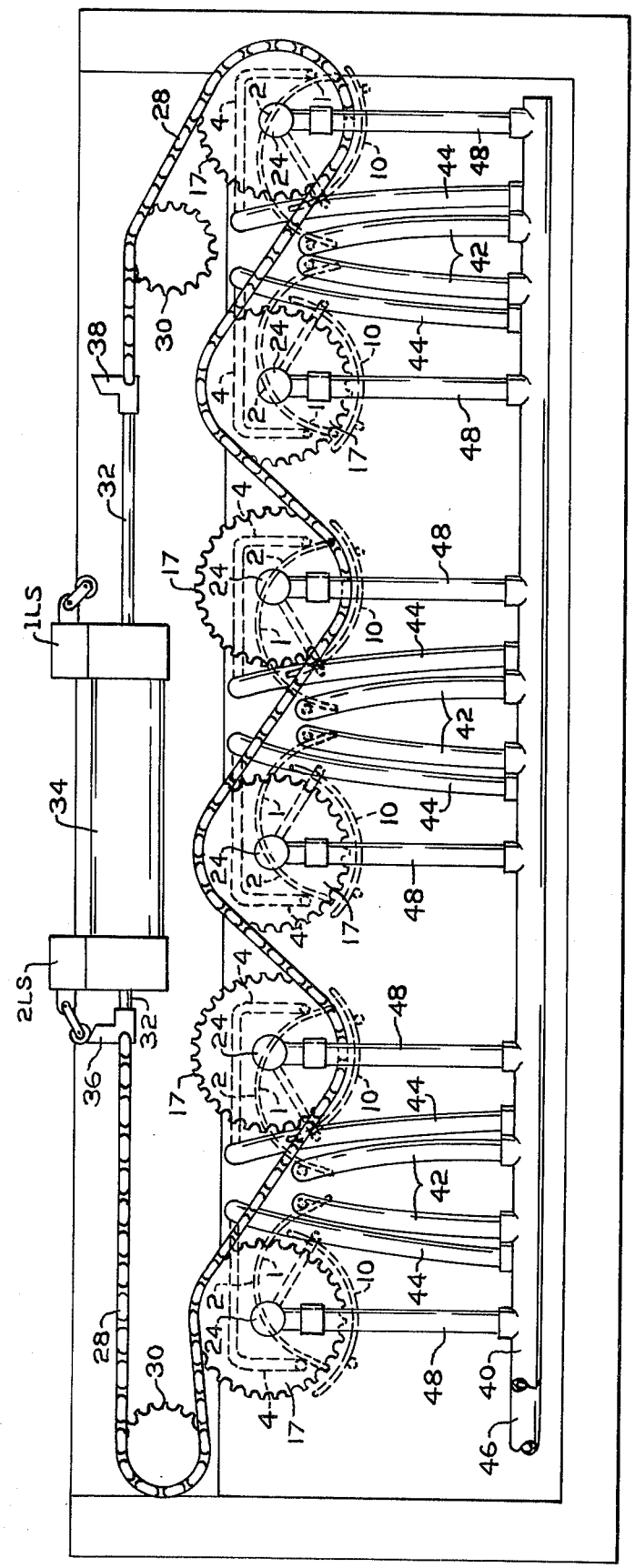
FIG. 4 shows a mechanism for operating the rotating shutters of an ultraviolet light processor.

FIG. 4 shows means for moving rotating shutters between the first, or open, position and the second, or closed, position. Reflectors 1 are accompanied by rotating shutters 10, shown in the closed position. To each shutter is attached a sprocket wheel 17 in the manner heretofore described. Engaging the sprocket wheel is sprocket chain 28, which passes over idlers 30 and the ends of which are connected to piston rod 32 of double actingpneumatic actuator 34. Other actuators, such as a spring loading single acting pneumatic actuator or a synchronous or other electric motor may be used instead of the actuator illustrated. Attached to the ends of piston rod 32 are cams 36 and 38. When the shutters are in the fully closed position, cam 36 engages the follower of limit switch 2LS, closing the contacts thereof and thereby lighting an indicator lamp. When the shutters are in the fully open position, cam 38 engages the follower of limit switch 1LS closing the contacts thereof and thereby lighting another indicator lamp.

Coolant is supplied to the conduits 4 (only partially shown in FIG. 4) attached to reflector housing 2 through entrance manifold 40 and flexible ducts 42. Coolant is removed from conduits 4 through flexible ducts 44 and exit manifold 46. Coolant is supplied to conduits 18 (only partially shown in FIG. 4) attached to shutters 10 through entrance manifold 40, pipes 48 and swivel adaptors 24 as earlier described. Coolant is removed from conduits 18 through swivel adaptors, pipes and an exit manifold, not shown, at the other side of the ultraviolet light processor. A conveyor of conventional design, not shown, passes workpieces beneath the reflectors for exposure to ultraviolet light.

FIGS. 5 and 6 show another means for moving rotating shutters between their open and closed positions. Reflectors 61, supported by base members 62 are accompanied by rotating shutters 64, shown in the closed position, and ultraviolet light emitting mercury vapor lamps 66. Mercury vapor lamps 66 are held in position by connectors 68. To each shutter is attached a pinion 70 which is engaged by rack 72. Rack 72 slides in bearings 73 and is attached to piston rod 74 of double acting pneumatic actuator 75 by bracket 76. Coolant is supplied to conduits 77, only partially shown, affixed to shutters 64 through entrance manifold 78, pipes 80 and swivel adaptors 82. Coolant is removed using substantially the same arrangement of parts at the other ends of the shutters. In the interest of clarity of illustration, conduits affixed to base membes 62 have not been shown on the drawing. The arrangement and function of these conduits and of the entrance and exit plumbing are the same as described with respect to FIG. 4.

Generally, the concave reflectors are substantially elliptical cylindrical reflectors. Each such reflector has a first focus and a second focus more remotely located from the reflectors than the first focus. Most often, substantially linear sources of ultraviolet light are located at the first foci of the reflectors, although moderate displacements from the first foci are sometimes used. The eccentricity of the substantially elliptical cylindrical reflectors is in the range of from about 0.2 to about 0.9 and is calculated from the formula $$e = (Z-z)/(Z-z)$$

where $e$ is the eccentricity, $Z$ is the distance of the second focus from the vertex of the ellipse and $z$ is the distance of the first focus from the vertex of the ellipse. Usually the eccentricity is in the range of from about 0.5 to about 0.8. While precisely elliptical reflectors are oftem employed in the invention, shapes which substantially approximate an ellipse and which introduce inconsequential aberrations may be used. In most systems, a circle closely approximates an ellipse and may be used in lieu of a precise ellipse without introducing appreciable undesirable aberrations. Lines tangent to the circular arc are sometimes used to approximate portions of the ellipse having slight curvature. Since most of the base members are formed by extruding aluminum through a die, use of lines and circular arcs permits easier fabrication of the die than if precisely elliptical arcs were employed. FIGS. 1 and 2 show base members formed by extrusion through dies constructed of lines and circular arcs. In the embodiment shown in FIG. 1, for example, the concave curve of base member 2 is a circular arc of 6.667 centimeters radius which subtends an angle of 134° at the center of the circle. The circular arc is symmetrical about the major axis of the ellipse being approximated. The two extremities of the base member are straight lines tangent to the ends of the circular arc. Alzak aluminum sheet having a thickness of about 0.076 centimeter is attached to the inner surface o the base member using screws. The first focus of the substantially elliptical cylindrical reflector lies in the plane symmetry and is 3.835 centimeters from the vertex of the reflector. The second focus also lies in the plane of symmetry and is 13,836 centimeters from the vertex of the reflector. The eccentricity of the reflector is therefore 0.566.

Figure 7:
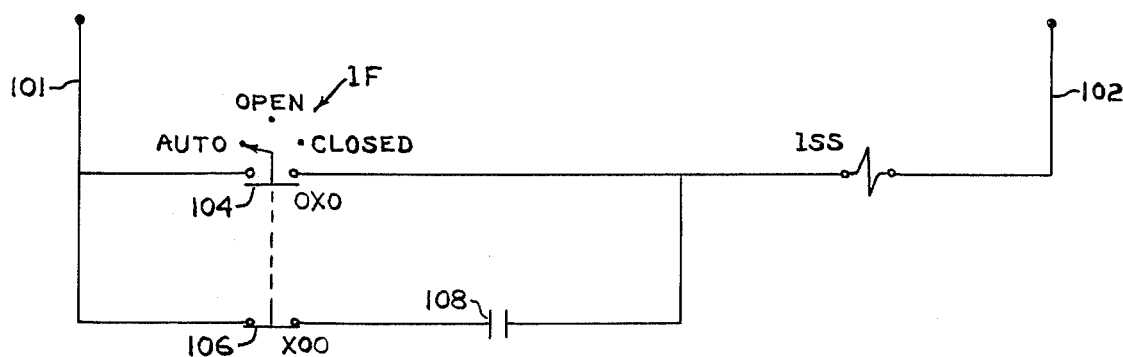
FIG. 7 is a schematic diagram of an electrical system suitable for operating the rotating shutters of the ultraviolet light processors of FIGS. 4, 5 and 6.
Figure 8:
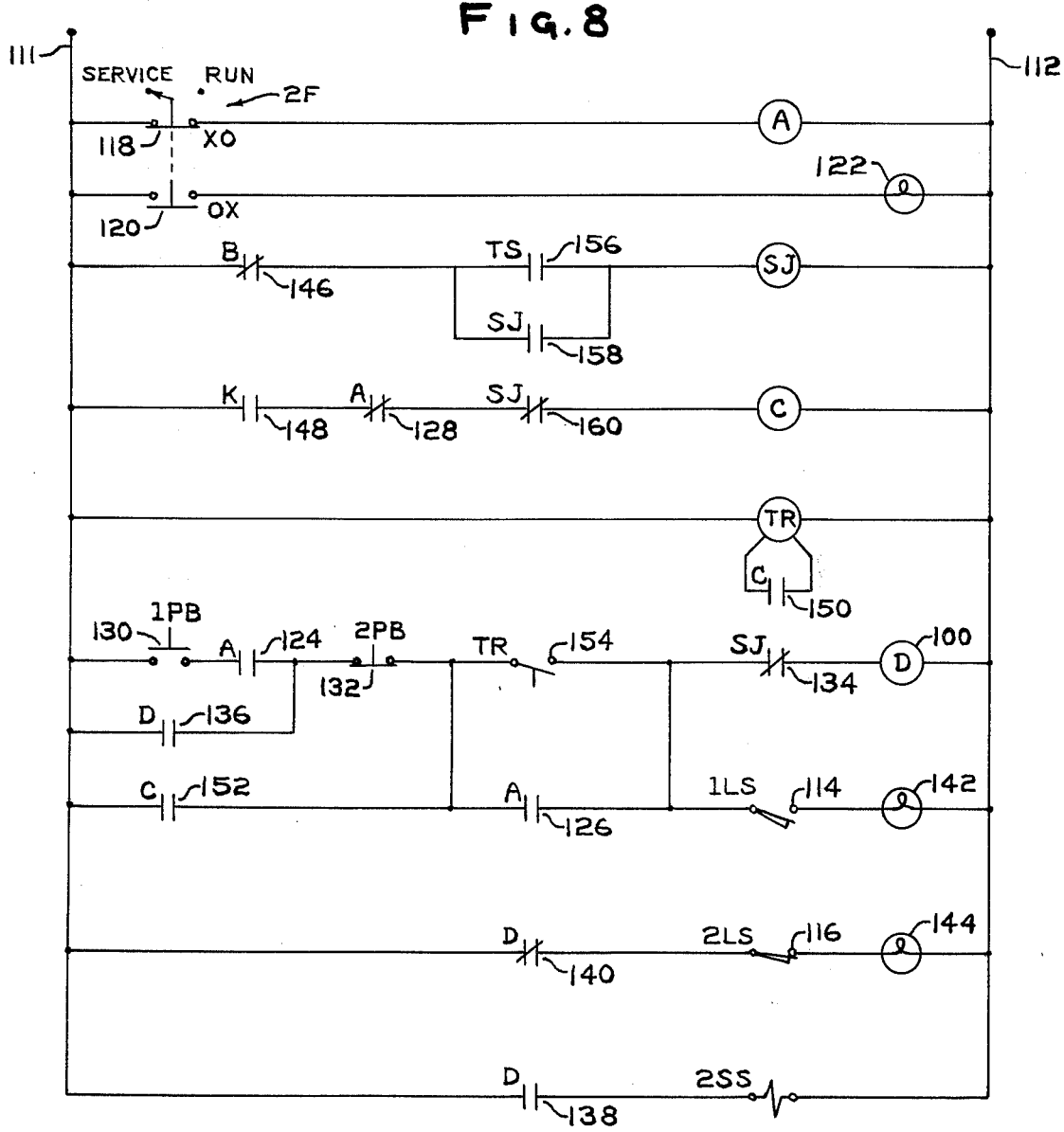
FIG. 8 is a schematic diagram of another electrical system suitable for operating the rotating shutters of the ultraviolet light processors of FIGS. 4, 5 and 6.

In FIGS. 7 and 8, the descriptions of which follow, normally open contacts of switches are represented by two spaced, vertical parallel lines such as for contacts 138 in FIG. 8. Normally closed contacts of switches are represented by two spaced, vertical parallel lines transversed by a diagonal such as for contacts 140 in FIG. 8. Switches with the same nomenclature are moved simultaneously. For example, when switch D of FIG. 8 is activated, contacts 140 are opened, contacts 136 are closed and contacts 138 are closed, all substantially simultaneously. Solenoids which activate switches are represented by circles identified by nomenclature corresponding to the switches activated. Activation of solenoid D, which is the same as solenoid 100, simultaneously activates switch D, and consequently, all contacts identified as D. Gang switches are represented in the manner of switch 1F of FIG. 7, comprising contacts 104 and 106, which are shown in the drawing for the most counterclockwise position of the switch. Adjacent each set of contacts is a diagram showing positions of contacts for each position of the control knob as the control knob is turned clockwise. Closed contacts are represented by X, and open contacts are represented by O. The symbol for contacts 104 is OXO which means that when the conrol knob is in the auto position, contacts 104 are open; when the control knob is in the open position, contacts 104 are closed; when the control knob is in the closed position, contacts 104 are open.

FIG. 7 represents an electrical system which may be used to open and close the rotating shutters of an ultraviolet light processor. Electrical power for the solenoid is supplied from a source, not shown, through lines 101 and 102. Advantagously, such power may be supplied at a potential of about 117 volts AC, although other voltages may, of course, be used. When switch 1F is in the open position, contacts 104 are closed and contacts 106 are open. Power is therefore supplied through contacts 104 to solenoid 1SS of a solenoid operated three-way valve. When solenoid 1SS is activated, the valve supplies air to the approriate side of the pneumatic actuator to open the shutters and allow air on the opposite side of the piston to be exhausted. When solenoid 1SS is inactivated, the valve supples air to the appropriate side of the pneumatic actuator to close the shutters and allow air on the opposite side of the piston to be exhausetd.

When switch 1F is in the closed position, contacts 104 and 106 are both open. Solenoid 1SS is therefore not activated and the shutters are closed. When switch 1F is in the auto position, contacts 104 are open and contacts 106 are closed. Solenoid 1SS is therefore activated only when contacts 108 are closed. Hence the shutter is closed unless contacts 108 are closed. Contacts 108 may be a part of a manually operated switch or an automatically operated switch. Usually the switch is a solenoid operated switch which closes contacts 108 only when the coating or printing machine preceding the ultraviolet light processor is operating satisfactorily.

FIG. 8 shows another, more elaborate electrical system which may be used to open and close the rotating shutters of an ultraviolet light processor. Although useful on coating lines where wood, particle board and similar substrates are coated, it is particularly useful on printing lines for curing printing ink which has been applied to a web by a preceding printing press.

Solenoid 2SS is analogous in structure and functions as solenoid 1SS of FIG. 7. When solenoid 2SS is activated, the shutters open; when solenoid 2SS is inactivated, the shutters close. Electrical power for the various solenoids, indicator lamps and timer is supplied from a source, not shown, through lines 110 and 112. Advantageously, such power may be supplied at a potential of about 117 volts AC, although other voltages may, of course, be used. Switch 2F may be a two position gang switch, as shown, or it may be a simple double throw switch or its equivalent. Contacts 114 of normally open limit switch 1LS are closed when the shutters are in the open position. This switch corresponds to limit switch 1LS of FIG. 4. Contacts 116 of normally open limit switch 2LS are closed when the shutters are closed. This switch corresponds to limit switch 2LS of FIG. 4. Since contacts 116 are shown held closed, the shutters are in the closed position. Switch B is a safety device and is activated when the radiation chamber of the ultraviolet light processor is opened for servicing. Switch K is activated when the coater or printing press preceding the ultraviolet light processor is operating satisfactorily.

When switch 2F is in the service position, contacts 118 are closed and contacts 120 are open. Solenoid A is therefore activated and indicator lamp 122 is out. The activation of solenoid A causes the closing of contacts 124 and 126 and the opening of contacts 128. Since contacts 128 are open, solenoid C cannot be activated. Upon pushing normally open pushbutton 1PB which closes contacts 130, electrical power is supplied through contacts 130, 124, contacts 132 of normally closed pushbutton 2PB and contacts 126 and 134 to activate solenoid D. Activation of solenoid D closes contacts 136 and 138 and opens contacts 140. Closure of contacts 136 provides a bypass around pushbutton 1PB so that upon release of pushbutton 1PB and the opening of contacts 130, solenoid D remains activated. Closure of contacts 138 activates solenoid 2SS which causes the shutters to open. Opening of contacts 140 extinguishes indicator lamp 144. As the shutters leave the closed position, contacts 116 are opened. When the shutters reach the open position, contacts 114 are closed and indicator lamp 142 is lighted. The shutter opening procedure is completed.

If, when the shutters are open and gang switch 2F is in the service position, pushbutton 2PB is pushed thereby opening contacts 132, then power is removed from solenoid D and indicator lamp 142. Inactivation of solenoid D opens contacts 136 and 138 and closes contacts 140. Because the opening of contacts 136 no longer provides a bypass around pushbutton 1PB, release of pushbutton 2PB and the closing of contacts 132 does not provide a path for power to energize solenoid D or indicator lamp 142. Solenoid D and indicator lamp 142 accordingly remain inactivated when pushbutton 2PB is released. The opening of contacts 138 inactivates solenoid 2SS, hence the shutters move to the closed position. As the shutters leave the open position, contacts 114 of limit switch 1LS are opened. When the shutters reach the closed position, contacts 116 of limit switch 2Ls are closed thereby causing indicator lamp 144 to become lighted.

When gang switch 2F is in the run position, solenoid A remains inactivated. Consequently, contacts 124 and 126 remain open and contacts 128 remain closed. Contacts 146 of switch B are closed because the means for access to the radiation chamber are closed. Assume that the shutters are initially closed. When the coating apparatus or printing press is operating satisfactorily, contacts 148 of switch K are closed, permitting solenoid C to become activated. Activation of solenoid C closes contacts 150 and 152 of switch C. Closure of contacts 150 activates time delay relay TR which immediately closes normally open contacts 154 of switch TR. Because contacts 152 and 154 are closed, solenoid D is activated. Activation of solenoid D closes contacts 136 and 138 and opens contacts 140. Closure of contacts 138 activates solenoid 2SS which causes the shutters to open. The opening of contacts 140 extinguishes indicator lamp 144. As the shutters leave the closed position, contacts 116 are opened. When the shutters reach the open position, contacts 114 are closed and indicator lamp 142 is lighted. The shutter opening procedure is completed. If contacts 148 of switch K now open, solenoid C is inactivated which opens contacts 150 and 152. The opening of contacts 152 does not inactivate solenoid D because power is transmitted through contacts 136, 132, 154 and 134 to solenoid D. The opening of contacts 150 causes the time delay relay TR to begin its timing period. The purpose of this timing period is to permit work which is within the ultraviolet light processor, or in some cases, work which is about to enter the ultraviolet light processor, to receive a full exposure of ultraviolet light before the shutters close. The precise timing period chosen is therefore dependent upon the arrangement and nature of the coating or printing line taken as a whole. Typically, the timing period has a duration in the range of from about 1 to about 60 seconds. Often, the timing period is in the range of from about 5 seconds to about 45 seconds. From about 15 seconds to about 30 seconds is preferred. At the conclusion of the timing period, time delay relay TR causes contacts 154 of switch TR to open. This inactivates solenoid D which opens contacts 136 and 138 and closes contacts 140.

The opening of contacts 138 inactivates solenoid 2SS, causing the shutters to close. As the shutters begin to move to the closed position, contacts 114 are opened and indicator lamp 142 is extinguished. When the shutters reach the closed position, contacts 116 are closed which causes indicator lamp 144 to become lighted. The closing sequence is now completed.

If gang switch 2F is in the run position and contacts 148 are closed, then contacts 116, 118, 124, 126 and 140 are open, contacts 114, 120, 128, 136, 138, 146, 150, 152 and 154 are closed and the shutters are open. If a workpiece or sheet jam occurs within the processor, it is sensed by touch switch TS and contacts 156 are closed, thereby activating solenoid SJ. Activation of solenoid SJ causes contacts 158 to close contacts 160 and 134 to open. Closure of contacts 158 keeps solenoid SJ activated even if contacts 156 subsequently open. The only way to deactivate solenoid SJ is to open the means of access into the radiation chamber thereby opening contacts 146 of switch B. The opening of contacts 134 immediately inactivates solenoid D thereby opening contacts 136 and 138 and closing contacts 140. The opening of contacts 138 inactivates solenoid 2SS causing the shutters to move to the closed position. As the shutters begin to close, contacts 114 are opened and indicator lamp 142 is extinguished. When the shutters reach the closed position, contacts 116 are closed causing indicator lamp 144 to become lighted. The opening of contacts 160 inactivates solenoid C, causing contacts 150 and 152 to open. Closure of contacts 150 causes the time delay relay TR to begin its timing period. Upon completion of the timing period, time delay relay TR causes contact 154 to open. This time, however, the time delay does not delay closing of the shutters because contacts 134, 136 and 152 are already open by the time contacts 154 are open. The system is reset, however, so that after the jam has been removed and the access means closed, the processor is ready to begin a new period of operation.

Any suitable source which emits ultraviolet light, viz., electromagnetic radiation having a wavelength in the range of from about 180 to about 400 nanometers, may be used in the practice of this invention. Suitable sources are mercury arcs, carbon arcs, low pressure mercury lamps, medium pressure mercury lamps, high pressure mercury lamps, swirl-flow plasma arc and ultraviolet light emitting diodes. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at both ends. Examples of these lamps are PPG Models 60-2032, 60-0393, 60-0197 and 60-2031 and Hanovia Models 6512A431, 6542A431, 6565A431 and 6577A431.

The voltages and currents used to operate the ultraviolet light sources are known in the art. When, for example, the ultraviolet light emitting lamps are metal halide seeded medium pressure mercury lamps, each having a length of about 6.35 centimeters, an alternating current voltage of about 800 volts may be impressed across each lamp. Each lamp then draws about 6.4 amperes.

Substantially any ultraviolet light curable coating composition can be cured using the present invention. These ultraviolet light curable coating compositions contain at least one polymer, oligomer or monomer which is ultraviolet light curable. Examples of such ultraviolet light curable materials are unsaturated polyesters, acrylic (including the $\alpha$-substituted acrylic) functional monomers, oligomers and polymers, the epoxy resins in admixture with masked Lewis acids, and the aminoplasts used in combination with a compound which ultraviolet light converts to an acid. Examples of such a compound to be used with aminoplast resins are the chloromethylated or bromomethylated aromatic ketones as exemplified by chloromethylbenzophenone.

The most commonly used ultraviolet light curable compounds contain a plurality of sites of ethylenic unsaturation which, under the influence of ultraviolet light become crosslinking sites through addition reactions. The sites of ethylenic unsaturation may lie along the backbond of the molecule or they may be present in side chains attached to the molecular backbond. As a further alternative, both of these arrangements may be present concurrently.

The organic ultraviolet light curable ethylenically unsaturated polyesters and the organic ultraviolet light curable arcylic oligomers, especially the oligomeric diacrylates and oligomeric dimethacrylates, constitute preferred classes of ultraviolet light curable compounds for use in the practice of this invention. An example of such an oligomeric diacrylate is 3-acryloxy-2,2-dimethylpropyl 3-acrylyloxy-2,2-dimethylpropionate.

Vinyl monomers which crosslink with the compound containing a plurality of sites of ethylenic unsaturation to form thermoset materials may be present in the coating composition. These monomers are preferably miscible with the compound and are preferably free of non-aromatic carbon-carbon conjugated double bonds. Examples of such vinyl monomers are styrene, divinyl benzene, methyl acrylate, methyl methacrylate, ethyl acrylate and butyl acrylate. The use of one or more vinyl monomers is desirable because the greater mobility of the smaller vinyl monomer molecule, as compared to the much larger first component, allows crosslinking to proceed faster than if the vinyl monomer were absent. Another benefit is that the vinyl monomer usually acts as a reactive solvent for the first component thereby providing coating compositions having a satisfactorily low viscosity without using an inordinate amount, if any at all, of volatile, non-reactive solvent.

The vinyl monomer, or mixtures of vinyl monomers, may be employed over a broad range. At the lower end of the range, no vinyl monomer need be used. The upper end of the range is a moderate excess of vinyl monomer over the stoichiometric amount required to crosslink the ethylenic unsaturation of the first component. The amount of monomer should be sufficient to provide a liquid, flowable, interpolymerizable mixture. Ordinarily, the monomer will be present in the coating composition in the range of from about 0 to about 45 percent by weight of the binder of the coating composition. When used, the vinyl monomer will ordinarily be in the range of from about 15 to about 30 percent by weight of the binder.

Extender pigments which are generally transparent to both ultraviolet light and visible light are optional ingredients which are often included in the coating composition. Examples of suitable extender pigments are finely divided particles of silica, barytes, calcium carbonate, talc, magnesium silicate, aluminum silicate, etc. The extender pigments do not ordinarily provide significant additional hiding, but they accelerate the rate at which opacity is obtained. Extender pigment is generally present in an amount in the range of from about 0 to about 40 percent by weight of the coating composition. An amount in the range of from about 0 to about 15 percent is more often employed. When extender pigment is used, it is usually present in the range of from about 1 to about 15 percent by weight of the coating composition. Although a single extender pigment is ordinarily used, mixtures of several extender pigments are satisfactory.

Opacifying or coloring pigments may also be included in the ultraviolet light curable coating compositions. The amount of these pigments should not be so great as to seriously interfere with the curing of the binder. Dyes and tints may similarly be included.

Another optional ingredient which is often included in the coating composition is an inert volatile organic solvent.

Photoinitiators, photosensitizers or both photoinitiators and photosensitizers are often included in ulraviolet light curable coating compositions. These materials are well known in the art. The preferred photosensitizer is benzophenone and the preferred photoinitiators are isobutyl benzoin ether, mixtures of butyl isomers of butyl benzoin ether and $\alpha,\alpha$-diethyoxyacetophenone.

The photoinitiator, photosensitizer or mixture of these is usually present in the ultraviolet light curable coating composition in an amount in the range of from about 0.01 percent to about 50 percent by weight of the binder of the coating composition. An amount in the range of from about 0.05 percent to about 10 percent is more often used. An amount in the range of from about 0.1 percent to about 5 percent is preferred.

Although several of the optional materials commonly found in ultraviolet light curable coating compositions have been described, the list is by no means inclusive. Other materials may be included for purposes known to the art.

Although the curing of the uncrosslinked coating composition (A-stage) may be carried out only until a gel (B-stage) is formed, it is generally preferred that curing should continue until the fully cured stage (C-stage) is obtained where the coating has been crosslinked into a hard, infusible film. These fully cured films exhibit the high abrasion resistance and high mar resistance customarily associated with C-stage polymer films.

The ultraviolet light curable coating compositions are used to form cured adherent coatings on substrates. The substrate is coated with the coating composition using substantially any technique known to the art. These include spraying, curtain coating, dipping, roller application, painting, brushing, printing, drawing and extrusion. The coated substrate is then passed under the reflectors of the ultraviolet light processor so that the coating is exposed to ultraviolet light of sufficient intensity for a time sufficient to crosslink the coating during the passage.

The times of exposure to ultraviolet light and the intensity of the ultraviolet light to which the coating composition is exposed may vary greatly. Generally the exposure to ultraviolet light should continue to the C-stage when hard, mar and abrasion resistant films result. In certain applications, however, it may be desirable for the curing to continue only to the B-stage.

Substrates which may be coated with the compositions of this invention to form workpieces may vary widely in their properties and may be of definite length or of long or indefinite length, such as a web. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

Cured coatings of the ultraviolet light curable coating composition usually have thicknesses in the range of from about 0.001 millimeter to about 3 millimeters. More often they have thicknesses in the range of from about 0.007 millimeter to about 0.3 millimeter. When the ultraviolet light curable coating composition is an ultraviolet light curable printing ink, the cured coatings usually have thicknesses in the range of from about 0.001 millimeter to about 0.03 millimeter.

We claim:
1. In an ultraviolet light processor having an optical system comprising at least one concave cylindrical reflector having a mouth through which ultraviolet light is reflected from a generally linear source of ultraviolet light to a workpiece, the improvement comprising a cylindrical shutter having a concave surface, said cylindrical shutter having an axis of rotation which is generally parallel to the elements of said concave cylindrical reflector and which axis of rotation is contained within space bounded by said reflector and its mouth, wherein said cylindrical shutter is
   a. rotatable to a first position between said source and said workpiece to block radiation emanating from said source from impinging upon said workpiece, wherein in said first position said concave surface is facing said source, and
   b. rotatable to a second position which is away from between said source and said workpiece to permit impingement of radiation emanating from said source upon said workpiece, wherein in said second position said concave surface is facing said source with said reflector therebetween.

2. The ultraviolet light processor of claim 1 wherein said concave cylindrical reflector is substantially elliptical.

3. The ultraviolet light processor of claim 2 wherein the eccentricity of said concave substantially elliptical cylindrical reflector is in the range of from about 0.2 to about 0.9.

4. The ultraviolet light processor of claim 3 wherein said generally linear source of ultraviolet light is located at the first focus of said substantially elliptical concave cylindrical reflector.

5. The ultraviolet light processor of claim 1 including at least one conduit affixed to said reflector for carrying coolant to cool said reflector.

6. The ultraviolet light processor of claim 1 including at least one conduit affixed to said shutter for carrying coolant to cool said shutter.

7. The ultraviolet light processor of claim 1 wherein said axis of rotation is between said reflector and said source.

8. The ultraviolet light processor of claim 1 including means for moving said shutter between said first position and said second position.

9. The ultraviolet light processor of claim 1 including means for moving a workpiece through ultraviolet light reflected from said source by said reflector.

10. The ultraviolet light processor of claim 9 wherein said means for moving a workpiece is a conveyor.

11. The ultraviolet light processor of claim 9 wherein said means for moving a workpiece is a rotating mandrel.

12. In an ultraviolet light processor having an optical system comprising a plurality of substantially elliptical concave cylindrical reflectors having mouths through which ultraviolet light from generally linear parallel sources of ultraviolet light located at the first foci of said reflectors to a workpiece, the improvement comprising cylindrical shutters, each of said shutters having a concave surface and an axis of rotation which is generally parallel to the elements of said concave cylindrical reflector and which axis of rotation is contained within space bounded by said reflector and its mouth, wherein said cylindrical shutter is
   a. rotatable to a first position between said source and said workpiece to block radiation emanating from said source from impinging upon said workpiece, wherein in said first position said concave surface is facing said source and
   b. rotatable to a second position which is away from between said source and said workpiece to permit impingement of radiation emanating from said source upon said workpiece wherein in said second position said concave surface is facing said source with said reflector interposed therebetween.

13. The ultraviolet light processor of claim 12 wherein said substantially elliptical concave cylindrical reflectors have eccentricities in the range of from about 0.2 to about 0.9.

14. The ultraviolet light processor of claim 13 including means for moving a workpiece through ultraviolet light reflected from said sources by said reflectors.

15. The ultraviolet light processor of claim 14 wherein said means for moving a workpiece is a conveyor.

16. The ultraviolet light processor of claim 14 wherein said means for moving a workpiece is a rotating mandrel.

17. The ultraviolet light processor of claim 13 including at least one conduit affixed to said shutters for carrying coolant to cool said shutters.

18. The ultraviolet light processor of claim 13 wherein the axes of rotation of said shutters is generally parallel to the first foci of said reflectors.

19. The ultraviolet light processor of claim 18 wherein each of said axes of rotation is within a space bounded by a reflector and the mouth of said reflector.

20. The ultraviolet light processor of claim 19 wherein each of said axes of rotation is between a reflector and its first focus.

21. The ultraviolet light processor of claim 13 including means for moving said shutters between said first positions and said second positions.

22. The ultraviolet light processor of claim 13 including at least one conduit affixed to said reflectors for carrying coolant to cool said reflectors.

* * * * *

UNITED STATES PATENT AND TRADEMARK OFFICE
CERTIFICATE OF CORRECTION

PATENT NO. : 4,025,795

DATED : May 24, 1977

INVENTOR(S) : James K. Lackore and Warren J. Ramler

It is certified that error appears in the above-identified patent and that said Letters Patent are hereby corrected as shown below:

Column 10, line 42, after "reflector" insert --interposed--.

Signed and Sealed this twenty-third Day of August 1977

[SEAL]

Attest:

RUTH C. MASON
Attesting Officer

C. MARSHALL DANN
Commissioner of Patents and Trademarks